United States Patent
McVeigh

[11] 4,012,122
[45] Mar. 15, 1977

[54] LIQUID CRYSTALLINE PLATEN FOR AN ELECTROPHOTOGRAPHIC PRINTING MACHINE

[75] Inventor: James H. McVeigh, Rochester, N.Y.

[73] Assignee: Xerox Corporation, Stamford, Conn.

[22] Filed: Apr. 28, 1975

[21] Appl. No.: 572,030

Related U.S. Application Data

[62] Division of Ser. No. 456,089, March 29, 1974, Pat. No. 3,936,172.

[52] U.S. Cl. .......................... 350/160 LC; 355/40; 355/79
[51] Int. Cl.² ........................................... G02F 1/13
[58] Field of Search ............... 350/160 LC; 355/40, 355/79

[56] References Cited

UNITED STATES PATENTS

| 3,642,371 | 2/1972 | Jones et al. | 355/128 |
| 3,807,833 | 4/1974 | Graham et al. | 350/160 LC |
| 3,824,604 | 7/1974 | Stein | 350/160 LC X |
| 3,844,650 | 10/1974 | Nicholson et al. | 350/160 LC x |

Primary Examiner—Edward S. Bauer
Attorney, Agent, or Firm—J. J. Ralabate; H. Fleischer; C. A. Green

[57] ABSTRACT

An apparatus in which an original document is housed. The support on which the original document is positioned becomes selectively opaque so as to mask portions of the original document disposed thereon.

6 Claims, 4 Drawing Figures

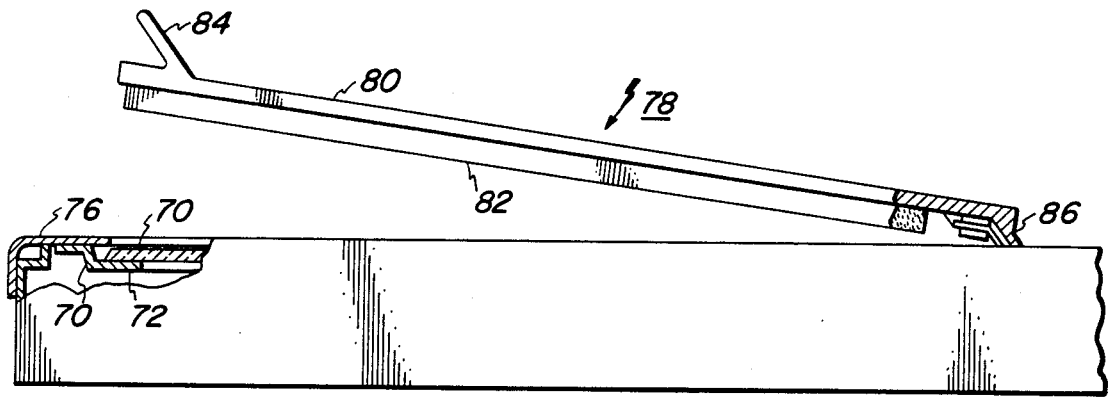
FIG. 2
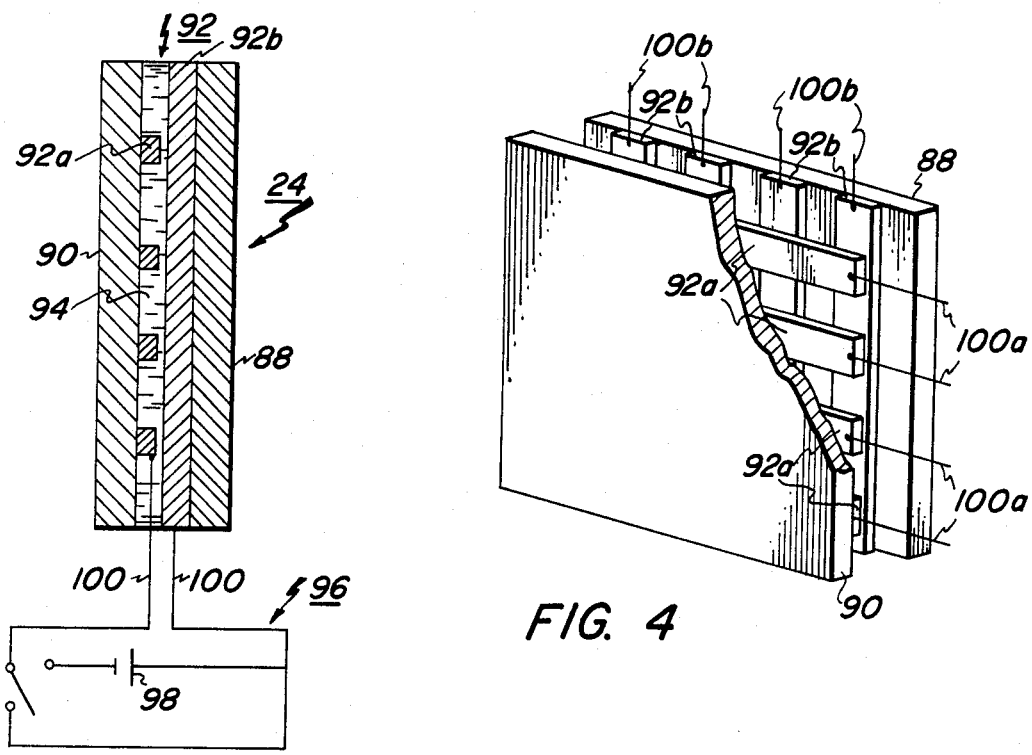
FIG. 3
FIG. 4

LIQUID CRYSTALLINE PLATEN FOR AN ELECTROPHOTOGRAPHIC PRINTING MACHINE

This is a division of application Ser. No. 456,089 filed Mar. 29, 1974 now U.S. Pat. No. 3,936,172.

The foregoing abstract is neither intended to define the invention disclosed in the specification, nor is it intended to be limiting as to the scope of the invention in any way.

BACKGROUND OF THE INVENTION

This invention generally relates to an electrophotographic printing machine, and more particularly concerns an apparatus for housing an original document therein.

Generally, electrophotographic printing machines are provided with a transparent platen upon which the original document is supported. An optical image of the original document is created and recorded as an electrostatic latent image upon a photoconductive surface. The printing machine is usually provided with a cover to prevent extraneous light from entering the optical system during the imaging process and to reflect light rays through the machine optical system.

Frequently, it is desired to mask selected portions of the original document so that the copies do not contain this information. Hereinbefore this has been accomplished by securing opaque sheets to the platen so as to prevent the illumination of selected portions of the original document. Similarly, it may be desirable to electrically create an original document. In the past, this has been accomplished through the utilization of a cathode ray tube which creates letters or other indicia and directly projects the foregoing onto a charged photoconductive surface recording an electrostatic latent image thereon.

Various types of platens have been employed in the art, most of these being transparent. With the advent of liquid crystalline technology, it has become feasible to employ a liquid crystalline platen. Liquid crystals are fluids that are partially ordered so that they have some of the optical properties of crystal. Although they have been known for nearly a century, their recent application to display systems dates back to the discovery in 1968 that they have readily usable electro-optical properties. This is disclosed in greater detail in an article entitled "Liquid-Crystal Display Devices" by G. H. Heilmeier; Scientific American, April, 1970. At present, there are two types of crystals used in displays; dynamic-scattering liquid crystals and field-effect liquid crystals. Only dynamic-scattering liquid crystals will be discussed in detail as these are more readily adaptable for employment as a platen. Dynamic-scattering liquid crystals are clear in the absence of an electric field. When an electric field is applied thereto, they turn cloudly and scatter light. This effect is like frosting a piece of glass. Devices can be made transmissive for rear of front lighting applications.

Liquid crystals have been employed as color filters for modulating light rays passing therethrough. This is described in greater detail in U.S. Pat. No. 3,569,614 issued to Hanlon in 1971. Generally, a liquid crystal cell includes a strip of microglass paper impregnated with liquid crystal material sandwiched between two substrates. Each of the substrates has a conductive material plated thereon. This is described in greater detail in U.S. Pat. No. 3,746,426, issued to Masi in 1973. It is evident that the employment of a transparent platen for supporting an original document which may be made selectively opaque would be highly desirable in an electrophotographic printing machine. The foregoing may be used to mask selected portions of the original document or to create an original document thereon.

Accordingly, it is the primary object of the present invention to improve platens supporting original documents in an electrophotographic printing machine so as to be selectively opaque or to be capable of forming indicia thereon.

SUMMARY OF THE INVENTION

Briefly stated, and in accordance with the present invention, there is provided an apparatus for housing an original document.

Pursuant to this invention, the apparatus includes a normally transparent support member arranged to hold the original document thereon. The support member is adapted to become opaque when electrically excited. Means are provided for electrically exciting the support member. In this manner, selected portions of the support member may be rendered opaque so as to mask predetermined regions of the original document.

BRIEF DESCRIPTION OF THE DRAWINGS

Other objects and advantages of the present invention will become apparent upon reading the following detailed description and upon reference to the drawings, in which:

FIG. 2 is an elevational view, partially in section, depicting the platen for supporting the original document in the FIG. 1 printing machine;

FIG. 3 is a sectional elevational view illustrating a liquid crystalline imaging cell employed in the FIG. 2 platen; and FIG. 4 is a schematic perspective view, partially fragmentary, of the FIG. 3 liquid crystalline imaging cell.

Figure 1:
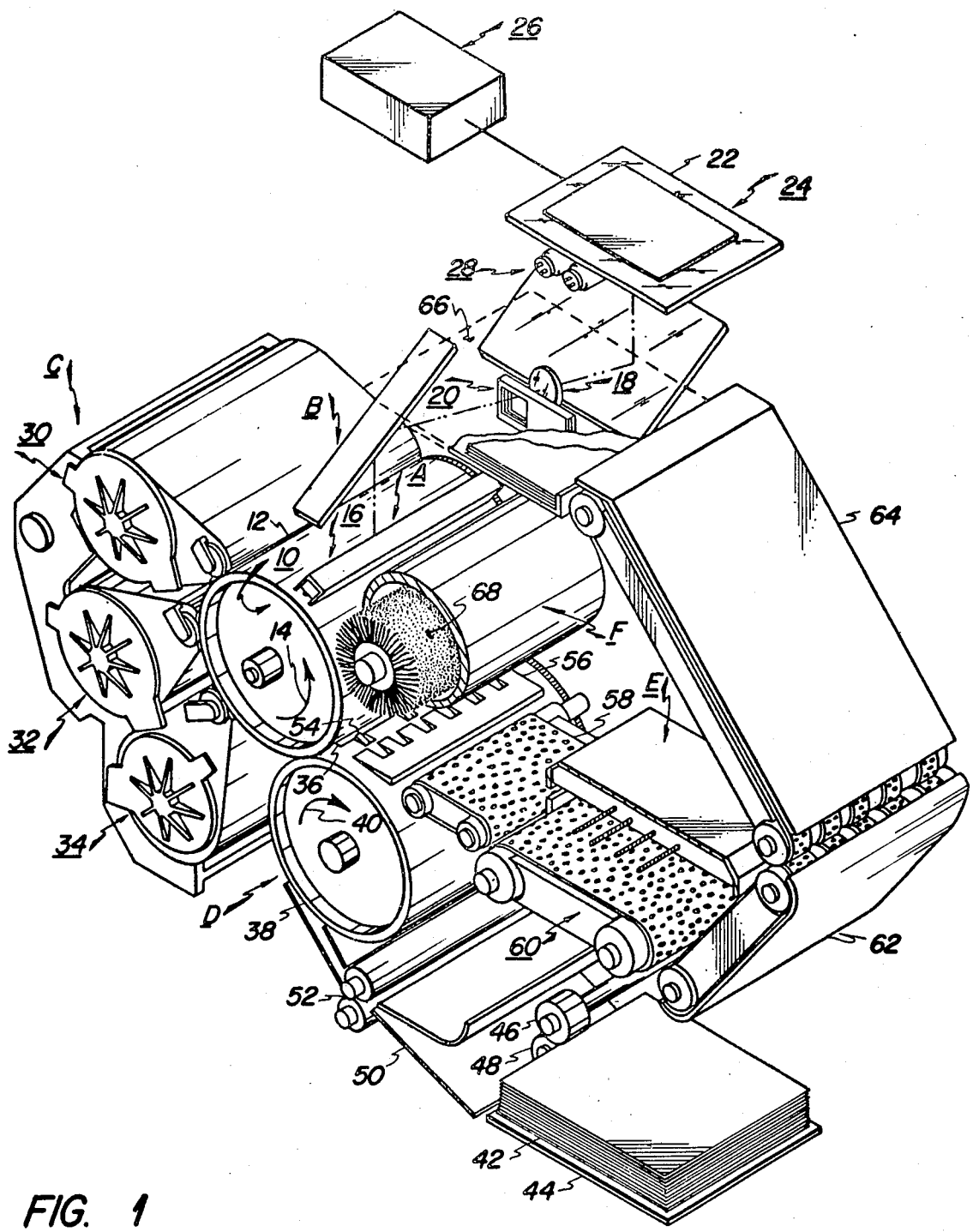
FIG. 1 is a schematic perspective view of an electrophotographic printing machine incorporating the features of the present invention therein.

While the present invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

For a general understanding of the disclosed electrophotographic printing machine, in which the present invention may be incorporated, reference is had to the drawings wherein like reference numerals have been used throughout to designate like elements. FIG. 1 schematically illustrates an electrophotographic printing machine employed to produce multi-color reproductions from a stationary original, the original either being transparent, translucent or opaque, whether in the form of single sheets, books or three dimensional objects.

As shown in FIG. 1, the electrophotographic printing machine includes a photoconductive member having a rotatably mounted drum 10 with a photoconductive surface 12 thereon. Drum 10 is mounted on a shaft in the machine frame (not shown) and adapted to rotate in the direction of arrow 14. This moves photoconductive surface 12 sequentially through a plurality of processing stations. A timing disc is mounted in the region of one end of the shaft of drum 10 so as to activate the appropriate processing station for producing the desired sequence of events in the printing machine. Preferably, the type of material employed for photoconductive surface 12 is described in U.S. Pat. No. 3,655,377 issued to Sechak in 1972.

For the purposes of the present disclosure several processing stations in the path of movement of photoconductive surface 12 are described functionally.

Drum 10 rotates initially to charging station A. At charging station A, a corona generating device, indicated generally at 16, charges photoconductive surface 12 to a relatively high, substantially uniform potential. Corona generating device 16 is arranged to extend in a generally transverse direction across photoconductive surface 12. Preferably, corona generating device 16 is of the type described in U.S. Pat. No. 2,778,946 issued to Mayo in 1957.

Drum 10 is next rotated to exposure station B where photoconductive surface 12 is exposed to a color filtered light image of the original document. A moving lens system, generally designated by a reference numeral 18, and a color filter mechanism shown generally at 20, are disposed at exposure station B. U.S. Pat. No. 3,062,108 issued to Mayo in 1962, described a suitable moving lens suitable for electrophotograpic printing. A suitable color filter mechanism is described in U.S. Pat. No. 3,775,006 issued to Hartman et al. in 1973. As shown in FIG. 1, original document 22 is supported stationarily upon support member 24. Support member 24 is a liquid crystalline imaging cell which is normally transparent. However, support member 24 may be suitably excited so that selected portions thereof are rendered opaque. Alternately, support member 24 may be suitably excited so as to produce indicia thereon. In this case, an original document would not be required. The optical system would produce a light image of the indicia depicted on support member 24 and the charged photocoductive surface would be irradiated thereby as to record an electrostatic latent image corresponding thereto. A suitable electronic computer 26 may be electrically connected to support member 24 to either produce indicia thereon or to render selected portions thereof opaque. In the alternative, support member 24 may function as an electronic display for the output from computer 26. In this embodiment, computer 26 functions as a general purpose computer solving a specified problem, but rather than printing the output therefrom on hard copy by conventional means, the output is electronically displaced as indicia on support member 24 so that a multi-color copy may be created therefrom by the electrophotographic printing machine shown in FIG. 1. Support member 24 will be described hereinafter in greater detail, in conjunction with FIGS. 3 and 4. The housing for supporting an original document 22 will also be described in greater detail with reference to FIG. 2.

Lamp assembly 28 and lens system 18 move in a timed relationship with drum 10 to scan successive incremental areas of original document 22 or the indicia formed on support member 24. In this manner, a flowing light image of original document 22 or the indicia recorded on support member 24 is produced. This light image irradiates the charged photoconductive surface 12 so as to create an electrostatic latent image thereon. During exposure, filter mechanism 20 interposes selected color filters into the optical light path. The color filters operate on the light rays passing through lens 18 to create a single color light image which records a single color electrostatic latent image on photoconductive surface 12. The foregoing single color latent image corresponds to a preselected spectral region of the electromagnetic wave spectrum.

After the electrostatic light image is recorded on photoconductive surface 12, drum 10 rotates to development station C. At development station C, three developer units, generally indicated by the reference numerals 30, 32 and 34 are positioned closely adjacent to drum 10. A suitable development station employing a plurality of developer units (in this case three) is disclosed in co-pending application Ser. No. 255,259, filed in 1972; now U.S. Pat. No. 3,854,449 issued to Davidson in 1974. The development units disclosed therein are magnetic brush developer units. A typical magnetic brush developer unit employs a magnetized developer mix which includes carrier granules and toner particles. A directional flux field continually forms a brush of developer mix. This brush of developer mix is brought into contact with the electrostatic latent image recorded on photoconductive surface 12. In this manner, toner particles are attracted electrostatically to the latent image rendering it visible. Developer units 30, 32 and 34, respectively, contain discretely colored toner particles. Each of the toner particles contained in the respective developer unit correspond to the complement of the single color light image transmitted through filter 20. For example, an electrostatic latent image formed from a green filtered light image is made visible by depositing green absorbing magenta toner particles thereon. Similarly, an electrostatic latent image formed from blue and red light images is developed with yellow and cyan toner particles, respectively. It should be noted, however, that during any one cycle, only one toner powder image is developed and transferred to a sheet of final support material 36. Hence, it is apparent that three cycles are required in order to complete the transfer of each of the respective toner powder images to support material 36.

It should be noted that black is created by superimposing layers of yellow, magenta and cyan toner particles on top of one another. When the original document is a black and white copy, the electrostatic latent image recorded on the photoconductive surface will correspond to the entire original document. Each latent image is developed with one of the colored toner particles. For example, the first latent image may be developed with yellow toner particles, the next with magenta toner particles, and finally, the last with cyan toner particles. Each of the toner powder images is transferred to the support sheet on top of one another so that the powder image contains three layers. When these toner powder layers are fused, they become translucent and act as filters reflecting the light transmitted through each layer from the support material to the eye of the observer. If the light is transmitted through all three layers, the observer sees a black image. If one of the layers is omitted, the observer will see the resultant color from the combination of the two layers present. This feature may be employed to produce a color highlighted copy from a black and white original document. For example, if a black and white original document containing 30 lines is placed on support member 24 and the resultant copy is desired to have lines 1 through 10, inclusive in red, and lines 10 through 30 in black, the following procedure would be employed. During the first cycle, support member 24 would be transparent and the electrostatic latent image corresponds to lines 1 through 30. This first latent image is developed with yellow toner particles. Support member 24 also remains transparent during the next cycle and the latent image, once again, corresponds to lines 1 through 30. This second latent image is developed with magenta toner particles. Finally, support member 24 is energized so as to mask lines 1 through 10 for the next cycle. Thus, the latent image of the third cycle corresponds to lines 10 through 30. This latent image is developed with cyan toner particles. Each of the foregoing toner powder images is transferred to the sheet of support material in superimposed registration with one another. This multi-layered toner powder image is then fused. The support material will have yellow, magenta and cyan layers on lines 10 through 30; lines 1 through 10 will have yellow and magenta layers. A combination of yellow, magneta and cyan produces black. Thus, lines 10 through 30 will be in black. A combination of yellow and magneta produces red. Hence, lines 1 through 10 will be in red. In this fashion, a copy will be produced having lines 1 through 10 highlighted in red, while lines 10 through 30 are black. It will be obvious to one skilled in the art that a color copy having any desired colors may be created by the foregoing procedure. One simply has to recollect that a combination of cyan and yellow produces green, and cyan and magneta produces blue. Thus, the foregoing procedure may be utilized to create a color copy from a black and white original having portions in black, as well as blue, green and red, or cyan, magenta, and yellow.

Continuing now with a description of the processing stations, drum 10 is now rotated to transfer station D where the powder image adhering electrostatically to photoconductive surface 12 is transferred to a sheet of final support material 36. An electrically biased transfer roll, shown generally at 38, recirculates sheet 36. Transfer roll 38 is biased electrically to a potential of sufficient magnitude and polarity to electrostatically attract toner particles from photoconductive surface 12 thereto. A suitable electrically biased transfer roll is described in U.S. Pat. No. 3,612,677 issued to Langdon et al. in 1971. Transfer roll 38, preferably is of the same diameter as drum 10 and rotates at the same annular velocity. Hence, transfer roll 38 rotates in synchronism with photoconductive surface 12. Inasmuch as support material 36 is releasably secured to transfer roll 38 for movement therewith in a recirculating path, successive toner powder images may be transferred thereto in superimposed registration from photoconductive surface 12. As depicted in FIG. 1, transfer roll 38 rotates in the direction indicated by arrow 40.

Support material 36 is advanced from a stack 42 supported on tray member 44. Feed roll 46, in operative communication with retard roll 48, separates and advances the uppermost sheet from stack 42. The advancing sheet moves into a paper chute 50 and is directed into the nip of register rolls 52. Thereafter, gripper fingers 54, mounted on transfer roll 38, secured releasably thereto support material 36 for movement in the recirculating path therewith. In this manner, successive toner powder images are attracted electrostatically to support material 36 in superimposed registration with one another forming a multi-layer toner powder image thereon. After a plurality of toner powder images have been transferred to support material 36, gripper fingers 54 raise support material 36 from transfer roll 38. As transfer roll 38 continues to rotate in the direction of arror 40, stripper bar 56 is interposed between support material 36 and transfer roll 38 to separate support material 36 therefrom. Support material 36 thereupon advances to endless belt conveyor 58. Endless belt conveyor 58 moves support material 36 to fixing station E.

At fixing station E, a fuser, indicated generally at 60, permanently affixes the transferred powder image to sheet 36. One type of suitable fused is disclosed in U.S. Pat. No. 3,498,592 issued to Moser et al. in 1970. After the fixing process, sheet 36 is advanced by endless belt conveyors 62 and 64 to catch tray 66 for subsequent removal therefrom by the machine operator.

After the transfer process inevitably, some residual toner particles remain on photoconductive surface 12. The final process station in the direction of rotation of drum 10, as indicated by arrow 14, is cleaning station F. U.S. Pat. No. 3,590,412 issued to Gerbasi in 1971 describes a suitable brush cleaning device. Fibrous brush 68 is positioned at cleaning station F and maintained in contact with photoconductive surface 12. Any residual toner particles remaining on photoconductive surface 12 after each transfer operation are removed therefrom by brush 68.

Referring now to FIG. 2, the platen cover arrangement is described there in greater detail. Support member 24, preferably, includes a substantially rectangular liquid crystalline imaging cell 70 which is secured by suitable means to the frame of the electrophotographic printing machine depicted in FIG. 1. Imaging cell 70 rests upon resilient means or a soft-edged gasket 72 which is secured to a horizontally dependent flange 74 of the rigid machine frame. A plate 76, affixed to the machine frame, is placed thereover and provided with an opening therein to expose the top surface of imaging cell 70.

A cover member or a platen cover 78 is mounted pivotably along one edge of support member 24 and includes a substantially rigid continuous outer shell 80 having affixed thereto a resilient sheet member 82 made of an elastomeric material such as a soft rubber-like backing. Resilient sheet member 82 may be fabricated from either a natural rubber or any number of commercially available synthetic rubbers, e.g. foam polyurethane which is affixed to outer shell 80 by means of a suitable adhesive. The resilient sheet 82 is flexible and colored white to reflect light rays therefrom. A handle 84 is provided at the free end of cover member 78 and provides a means by which a cover member 78 can be raised and lowered. This permits cover member 78 to be raised over large objects to be reproduced, such as books, while still permitting cover member 78 to lie in a plane substantially parallel to imaging cell 70. To achieve the foregoing, cover member 78 is double hinged. Double hinge 86 is secured to cover member 78 at the end thereof opposed from handle 84. A suitable double hinge is described in U.S. Pat. No. 3,062,110 issued to Shepardeson et al. in 1962.

FIG. 3 illustrates support member 24 in greater detail. As shown in FIG. 3, liquid crystalline imaging cell 70 includes a pair of plates, generally designated by the reference numerals 88 and 90. Plates 88 and 90 are substantially transparent. A grid of transparent electrodes 92 is interposed between plates 88 and 90. On the inner surface of plate 90 is an array of transparent conductive strips 92a all running in one direction. Four strips or electrodes are shown which have parallel longitudinal axes. However, it will be understood that in actual practice a larger number of electrodes may be employed. On the inner surface of plate 88 are arranged an array of transparent electrodes 92b having parallel longitudinal axes and being positioned substantially perpendicularly to the direction of conductive strips 92a on plate 90. Again, it will be understood that in actual practice, a much larger number of electrodes may be arranged on the inner surface of plate 88. A layer of liquid crystalline material 94 is located in the space between plates 88 and 90. For purposes of illustration, grid 92 may be formed by an etching process. Preferably, plates 88 and 90 are transparent electrically conductive electrodes commercially available under the name NESA Glass from Pittsburgh Plate Glass Company. Each plate includes a thin transparent electrically conductive layer of tin oxide overlying a transparent glass substrate. The tin oxide layer is etched away so as to form a plurality of parallel lines of tin oxide theron. For example, the tin oxide lines 92a on plate 90 would be substantially perpendicular to the tin oxide lines 92b on plate 88. Thus, the pair of plates together form a rectangular grip structure. A liquid crystalline film or layer 94 is interposed between plates 88 and 90. This layer of liquid crystalline material is the active element of the imaging cell. A field is created between the electrodes by means of an external circuit, generally designated by the reference numeral 96, which typically comprises a source of potential 98 which is connected across the electrodes through leads 100. Circuit 96 may also contain suitable switching means. Potential source 98 may be either D.C., A.C., or a combination thereof.

When an electric field of sufficient magnitude, e.g. above about 3,000 volts/centimeter, is applied across liquid crystalline film 94 the optical properties of the liquid crystalline material change and the liquid crystalline film, which is substantially transparent prior to the application of the field becomes "frosted", i.e. exhibits dynamic scattering. Thus, the imaging cell can function as a light shutter since a large percentage, e.g. about 90% of the light, would be scattered while only a small percentage, e.g. about 10% would be transmitted.

As alternate manner in which the grid structure may be formed would be to utilize glass or plastic plates and have grid lines formed from conductive materials such as tin, indium oxide, aluminum, chromium, tin oxide or any other suitable conductor evaporated onto the glass or plastic plates.

It will be understood by those skilled in the art that when two electrode strips, each being perpendicular to one another, are energized with the applied voltage, the portion of the liquid crystal cell corresponding to the intersection of the two electrodes which have been energized will become darker than the remaining area of the imaging cell. By energizing more than one set of electrode strip predetermined areas are made to appear darker, or substantially opaque.

FIG. 4 depicts plates 88 and 90 in perspective. As shown therein, plates 88 and 90 are sandwiched together with the liquid crystalline material interposed therebetween. Conductors 92a extend in a horizontal direction and are formed on plate 90. Similarly, conductors 92b are formed on plate 88 and extend in a substantially vertical direction. Electric lead wires 100a are connected to each of the grids 92a. Similarly, electric lead wires 100b are connected to conductors 92b. Thus when a selected lead wire 100a is excited and the corresponding selected lead wire 100b is excited, a portion of the imaging cell is darkened or becomes opaque and does not transmit light therethrough. When this arrangement is employed as a platen, it may mask selected portions of the original document. This is achieved by exciting the appropriate regions of the imaging cell so as to prevent light rays from passing therethrough. Thus, the light rays will only pass through the substantially transparent portions of the imaging cell illuminating the original document disposed therebehind and producing an electrostatic latent image on photoconductive surface 12 corresponding to the unmasked portions of the original document.

An alternate embodiment would employ imaging cell 24 to create indicia thereon. In this type of embodiment, the grid structure would be extremely fine and selected areas thereon would be excited so as to darken the imaging cell in those regions. This would produce the requisite indicia on the imaging cell. This type of arrangement, however, would require a computer to excite the grid structure appropriately so as to form the desired indicia. Computer 26 (FIG. 1) would excite imaging cell 24 in the selected regions thereon. For example, a picture or selected words may be created on imaging cell 24. Thus, imaging cell 24 would function as an original document. The original document would be continously variable depending upon the input from the computer.

It is therefore, apparent that there has been provided in accordance with the present invention, an apparatus for masking selected portions of an original document or, in lieu thereof, for creating an original document, or a color copy from a black and white original. This apparatus fully satisfies the objects, aims, and advantages that are set forth above. While the present invention has been described in conjunction with specific embodiments thereof, it is evident that many alternatives, modifications and variations will be apparent to those skilled in the art in light of the foregoing description. Accordingly, it is intended to embrace all such alternatives, modifications and variations that fall within the spirit and broad scope of the appended claims.

What is claimed is:

1. An apparatus for housing a substantially opaque document having indicia on one surface thereof, including:
   a normally transparent support member having the opaque document disposed thereon with the surface having the indicia being adjacent to said support member, said support member being adapted to become opaque when electrically excited;
   means for illuminating the opaque document, said support member being interposed between the opaque document and said illuminating means; and
   means for electrically exciting said support member so that selected portions thereof become opaque to thereby mask predetermined regions of the indicia on the opaque document with the unmasked portions thereof being illuminated.

2. An apparatus as recited in claim 1, wherein said support member includes a liquid crystalline imaging cell.

3. An apparatus as recited in claim 2, wherein said liquid crystalline imaging cell includes:

a pair of opposed, spaced substantially transparent plates;

a grid of transparent electrodes interposed between said pair of plates; and a layer of liquid crystalline material interposed between said pairs of plates and contacting said grid.

4. An apparatus as recited in claim 3, wherein said support member includes:

a substantially rigid frame member having an aperture therein; and resilient means secured to said frame member on the periphery of the aperture therein, said liquid crystalline imaging cell being mounted on said resilient means in the aperture of said frame member permitting light rays to be transmitted through the transparent portions thereof.

5. An apparatus as recited in claim 4, further including a cover member operatively associated with said support member, said cover member being movable from an opened position permitting the original document to be disposed on said support member to a closed position securing releasably thereon the original document.

6. An apparatus as recited in claim 5, wherein said cover member includes:

a substatially rigid outer shell; and a resilient sheet member secured to said outer shell, said sheet member contacting the original document in the closed position.

* * * * *